Aug. 16, 1932.   L. J. LARSON   1,872,306

ELECTRIC ARC WELDING

Filed Feb. 17, 1930

INVENTOR.
Louis J. Larson
BY
ATTORNEY.

Patented Aug. 16, 1932

1,872,306

UNITED STATES PATENT OFFICE

LOUIS J. LARSON, OF MILWAUKEE, WISCONSIN, ASSIGNOR TO A. O. SMITH CORPORATION, OF MILWAUKEE, WISCONSIN, A CORPORATION OF NEW YORK

ELECTRIC ARC WELDING

Application filed February 17, 1930. Serial No. 429,062.

This invention relates to electric arc welding, and more particularly to the arrangement and preparation of the edges of the plates for welding where said plates are of substantial thickness.

The object of the invention is to provide a welding groove between the thick metal edges of the plates of such shape and character as to allow the welding operations to be performed from one side of the plates only and to provide a weld which is more sound and of more uniform quality.

Other objects will appear with reference to the preferred embodiment of the invention as illustrated in the accompanying drawing in which.

Figure 1:
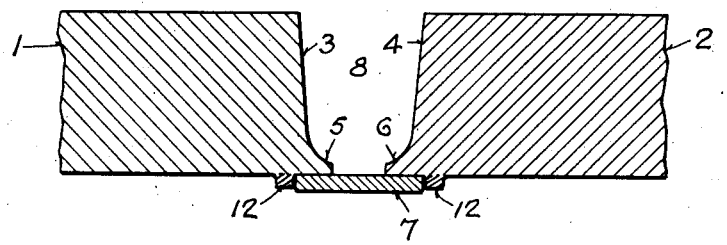
Figure 1 is a transverse section through the plates showing the welding groove.

The plates 1 and 2 to be welded together have their respective edges 3 and 4 scarfed to provide relatively thin projecting lips 5 and 6, respectively, which oppose each other and extend for the full length of the edges at the bottom of plates. The edges 3 and 4 above the lips 5 and 6, respectively, are caused to diverge slightly from each other and from the perpendicular.

A backing strip or welding dam 7 is placed below the juxtaposed edges and in contact with the lower sides of the lips 5 and 6. The lips 5 and 6 are preferably spaced a substantial distance apart so that the strip 7 forms the bottom of a welding groove 8 while the lips fill in the lower corners of the groove.

Figure 2:
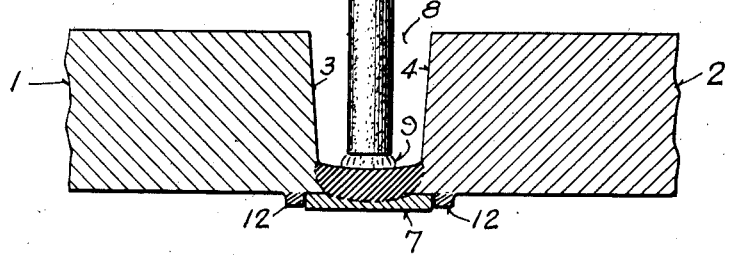
Fig. 2 is a similar section showing a step in the welding operation.
Figure 3:
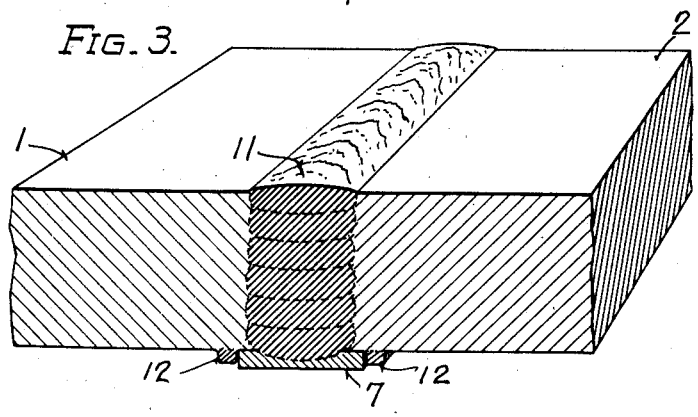
Fig. 3 is a similar section in perspective showing the finished weld.
Figure 4:
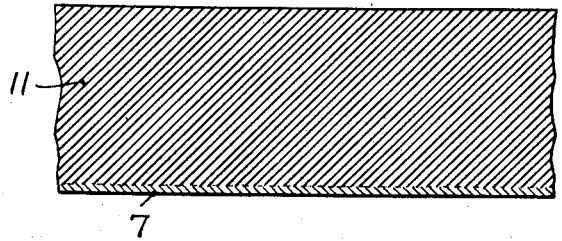
Fig. 4 is a longitudinal vertical section through the weld.

In welding the plates together as shown in Fig. 2, the arc 9 which is established between the bottom of the groove 8 and a fusible metallic weldrod 10 fuses the metal of the lips 5 and 6 with that of the strip 7 and thereby seals the crack between the plates and strip. At the same time a layer of weld metal is deposited between the lips 5 and 6 and upon the strip 7 uniting the parts into an integral structure.

The welding operation is repeated in passes along the groove 8 until the successive layers of deposited weld metal 11 completely fill the welding groove and the plates are united as one.

The invention as applied above eliminates the tendency of growth of shrink cracks starting at the lower corners of the welding groove, which cracks have heretofore been caused from a lack of fusion of the metals at such locations.

The invention is particularly adapted to the manufacture of thick walled pressure vessels wherein it is desirable to provide a weld of as great a strength as that of the original plate.

The backing strip 7 may be centered with respect to the welding groove by means of lugs 12 secured to the under sides of the plates 1 and 2 as by welding. The lugs 12 also provide in cooperation with the chill strip a convenient means for properly spacing the edges 3 and 4 to form a welding groove of the required width.

Various modifications of the invention may be employed within the scope of the accompanying claims.

I claim:

1. The method of welding thick metal plates which comprises providing a thin projecting lip at the lower corner of each edge to be welded and extending for the full length of the edge, spacing the edges in juxtaposed relation with said lips spaced apart, providing a welding dam below said edges to form the bottom of a welding groove therebetween, and employing a fusible metallic electrode to deposit welding metal in said groove by means of an electric arc, said weld metal being fused with the metal of the lips and the welding dam and also with the metal of the edges to provide an integral welded structure.

2. The method of welding thick metal plates which comprises providing lugs on the lower surface of said plates near the edges to be welded and uniformly spaced therefrom, arranging the plates with the edges in juxtaposed relation for welding, providing a backing strip beneath the edges and cooperating with the lugs on the respective plates to space the edges a predetermined distance, said backing strip forming the bottom of a welding groove between the edges, and depositing weld metal in said welding groove, said weld metal being fused with the metal of the edges and of the backing strip to form an integral welded structure.

3. The method of welding thick metal plates which comprises providing a projecting lip on each plate which extends substantially the length of the side of the plate, positioning the plates in opposed relation with the lips spaced and in substantial alignment, providing a welding dam in cooperative relation with the lips to bridge the gap between them and to form a welding groove, and depositing weld metal in the groove from a fusible metallic electrode by means of an electric arc, the weld metal being fused with the metal of the lips and the welding dam and also with the metal of the plates to provide an integral welded structure.

In testimony whereof I have signed my name at Milwaukee, Wisconsin, this 13th day of February, 1930.

LOUIS J. LARSON.